No. 886,673. PATENTED MAY 5, 1908.
J. BIANCHI.
PHOTOGRAPHIC FILM FOR DAYLIGHT LOADING.
APPLICATION FILED JULY 5, 1907.
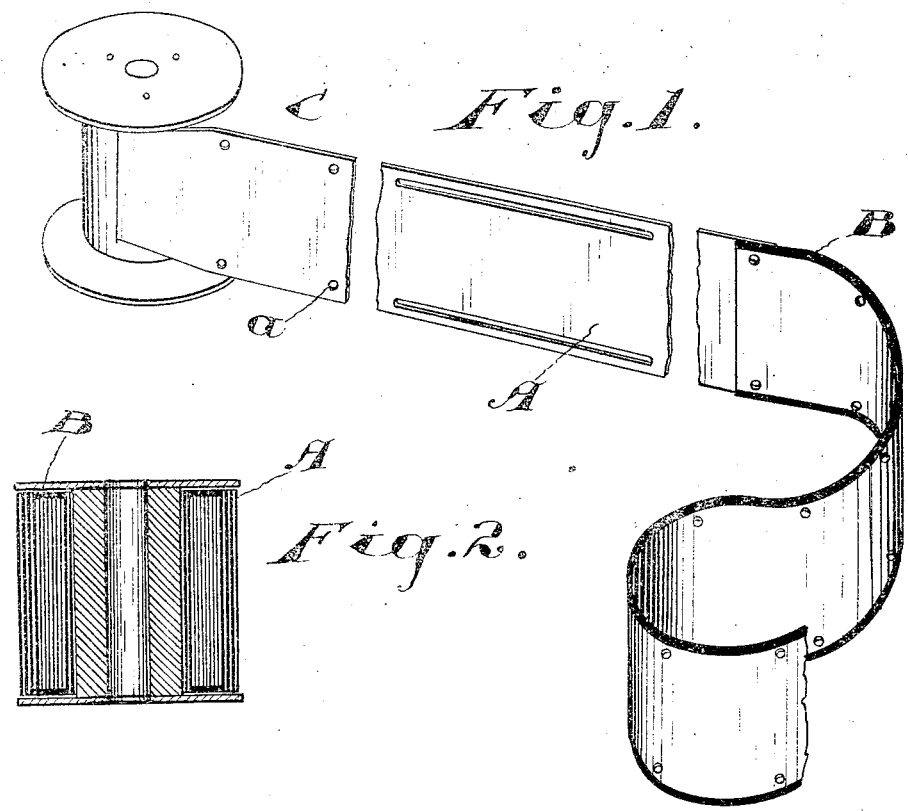
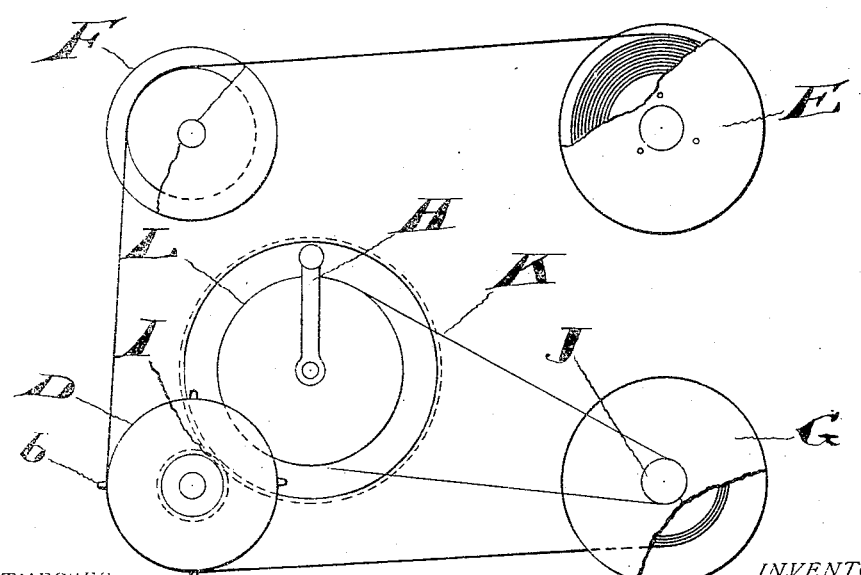
WITNESSES
INVENTOR.
Joseph Bianchi
BY Ridout & Maybee
ATTORNEYS

UNITED STATES PATENT OFFICE.

JOSEPH BIANCHI, OF TORONTO, ONTARIO, CANADA, ASSIGNOR OF ONE-HALF TO SAMUEL CASEY WOOD, OF TORONTO, CANADA.

PHOTOGRAPHIC FILM FOR DAYLIGHT LOADING.

No. 886,673.

Specification of Letters Patent.

Patented May 5, 1908.

Application filed July 5, 1907. Serial No. 382,357.

*To all whom it may concern:*

Be it known that I, JOSEPH BIANCHI, a citizen of the United States, residing in the city of Toronto, county of York, Province of Ontario, Canada, have invented certain new and useful Improvements in Photographic Films for Daylight Loading, of which the following is a specification.

My invention relates to improvements in what are known as daylight cartridges, spools, rollers and the like for photographic apparatus, and particularly to that species in which the sensitive surface is protected from light so as to permit of the camera being loaded in daylight. In such films or the like the ordinary protective outer coverings are removed before the films are placed in position in the camera and at this time light is very liable to reach the unprotected edges of the film and fog the sensitive surface from the edges inwardly. This is particularly liable to happen with the ribbon shaped films commonly employed in moving picture cameras, which films are usually rolled on spools, and in which, owing to the rapidity with which the ribbon is rolled upon the spools, it is impossible to have the spool ends in very close contact with the edges of the ribbon.

While for ordinary cameras in which the films are changed slowly a ribbon of dark paper is rolled in with the sensitive film with moving picture films such dark paper packings are not feasible. In any case I have found they do not give complete immunity from fog, and my invention is equally applicable to these films for ordinary cameras.

I have produced a film which is preferably light proof without the use of the interwound paper. I obtain my object by coloring each margin of the film with a narrow stripe of a suitable non-actinic color, an opaque color being preferred. This stripe is preferably located at the extreme margin of the surface of the back or front of the film, or both, though I do not limit myself to this. This colored stripe may be formed by applying a liquid color to the edge of the film after the latter has been sensitized and cut, or the coloring may be introduced in the manufacture of the film itself previous to sensitizing. While I prefer to apply a pigment yet in some cases the colored stripe might be an independent piece of opaque or non-actinically colored material applied to the edge of the film, though I do not consider this latter modification desirable. The coloring may also be applied by brushing the edges of a lightly rolled ribbon of film with a coloring matter, preferably opaque. In this case the colored stripe is formed on the extreme edges of the film, and scarcely, if at all, encroaches on either surface.

A film constructed as I have described when closely rolled on the spool has its sensitive surface at all parts protected by a non-actinic edging which absorbs all the light which may pass between the edges of the film and the ends of the spool. As in my preferred form there is no thickening of the film and no interwound paper the smooth film will roll very closely and tightly so that the non-actinic edgings form an absolute protection against fog creeping inward from the exposed edges of the film.

The device is illustrated in the accompanying drawings, in which

Figure 1 is a perspective view of part of a ribbon of film attached to a spool. Fig. 2 is a vertical section of a spool of film. Fig. 3 is a plan view, diagrammatic, showing a ribbon of film in position in a "moving picture" camera.

In the drawings like letters of reference indicate corresponding parts in the different figures.

A is the film of ordinary construction and B is the marginal colored stripe.

It will be seen on reference to Fig. 2 that light may creep in between the flanged ends of the spool and the edges of the film, and this light, as already described, is completely absorbed by the non-actinic stripe. The film when rewound on a spool after exposure in the camera must be tightly wound to enable it to be removed in daylight, as otherwise the striped edge is of little value. I have therefore devised the following arrangement for this purpose. The leader C secured to the end of the film is like the film itself provided with the perforations $a$, which engage the pins $b$ of the roller D, (see Fig. 4) which draws the film through the camera. These leaders are ordinarily of black paper.

The film is shown as being drawn from the spool E round the rollers F and D, and wound on the spool G. The roller D is driven from the crank handle H by the gearing I, and the spool G is driven by its spindle, to which is secured the pulley J driven by a cord K from the pulley L, rotated by the crank handle. It will be seen that in the leader C, near the end, gaps or slots are cut in line with the perforations a, so that when these gaps reach the roller D the latter ceases to feed the film just as the end of the ribbon is reached. This prevents the ribbon being torn by the continued turning of the roller through the medium of the crank handle, at the same time the winding spool may be continued in movement to take up any slack and wind the film as tightly as desired. It is then safe to seal up and remove the spool in daylight as the leader protects the outside of the film; and the colored stripes protect the edges of the film within the ends of the spool.

What I claim as my invention is:

1. A photographic film having its edges provided with a marginal stripe of a non-actinic color.

2. A photographic film having its edges provided with a marginal stripe of an opaque color.

3. A photographic film having its edges tinted with a non-actinic color.

4. A photographic film having its edges tinted with an opaque color.

5. A photographic film having its edges tinted with a non-actinic opaque color.

6. A sensitized ribbon of photographic film having its edges tinted with a marginal stripe of a non-actinic color.

7. A sensitized ribbon of photographic film having its edges tinted with a marginal stripe of an opaque color.

8. A sensitized ribbon of photographic film having its edges tinted with a marginal stripe of a non-actinic opaque color.

9. A photographic film having its margins rendered light absorptive by the application of a non-soluble coloring material.

10. A ribbon of photographic film having a leader attached thereto provided with a series of perforations for engagement with a shifting device and having near its end a gap or slot in line with the perforations.

11. A ribbon of photographic film having light absorptive margins and having a leader attached thereto provided with a series of perforations for engagement with a shifting device and having near its end a gap or slot in line with the perforations.

Toronto, Ont., 28th June, 1907.

JOSEPH BIANCHI.

Signed in the presence of—
J. EDW. MAYBEE,
F W. McKENDRICK.